(12) United States Patent
Jang et al.

(10) Patent No.: US 10,405,559 B2
(45) Date of Patent: Sep. 10, 2019

(54) METHOD FOR PROCESSING GREEN COFFEE BEANS

(71) Applicant: Sung Gi Jang, Nonsan-si (KR)

(72) Inventors: Sung Gi Jang, Nonsan-si (KR); Suck Soon Chi, Nonsan-si (KR)

(73) Assignee: Sung Gi Jang, Nonsan-si (KR)

( * ) Notice: Subject to any disclaimer, the term of this patent is extended or adjusted under 35 U.S.C. 154(b) by 15 days.

(21) Appl. No.: 15/854,732

(22) Filed: Dec. 26, 2017

(65) Prior Publication Data

US 2018/0228177 A1 Aug. 16, 2018

(30) Foreign Application Priority Data

Feb. 13, 2017 (KR) .......................... 10-2017-0019219

(51) Int. Cl.
*A23F 5/02* (2006.01)
*A23F 5/16* (2006.01)
(Continued)

(52) U.S. Cl.
CPC ..................... *A23F 5/02* (2013.01); *A23F 5/00* (2013.01); *A23F 5/16* (2013.01); *A23F 5/163* (2013.01);
(Continued)

(58) Field of Classification Search
CPC ...... A23F 3/00; A23F 3/03; A23F 3/08; A23F 5/00; A23F 5/02; A23F 5/16; A23F 5/166;
(Continued)

(56) References Cited

U.S. PATENT DOCUMENTS 2,233,033 A * 2/1941 Robison .................... A23F 5/02
426/45
2,725,299 A * 11/1955 Platel ........................ A23F 5/02
426/312
(Continued)

FOREIGN PATENT DOCUMENTS

EP 0482675 A2 * 4/1992 ............... A23F 5/02
GB 2500662 A * 10/2013 ............... A23F 5/02
(Continued)

OTHER PUBLICATIONS

KR 10-1060203 B1 translation, published Aug. 29, 2011 (Year: 2011).*

*Primary Examiner* — Drew E Becker
*Assistant Examiner* — Bryan Kim
(74) *Attorney, Agent, or Firm* — KORUS Patent, LLC; Seong Il Jeong

(57) ABSTRACT

Disclosed herein is a method for processing green coffee beans, including: (1) loading unroasted green coffee beans on a mesh-like plate, placing in a container the mesh-like plate having the green coffee beans loaded thereon, introducing water into the bottom of the container so as to be spaced apart from the lower surface of the mesh-like plate, and closing the lid of the container to seal the container; (2) placing the sealed container in a heating cabinet, and then steaming the green coffee beans at low temperature for 10 to 12 days while maintaining the internal temperature of the heating cabinet at 70 to 80° C.; and (3) opening the lid of the container, and then drying the steamed green coffee beans for 4 to 6 days while maintaining the internal temperature of the heating cabinet at 38 to 43° C.

1 Claim, 4 Drawing Sheets

(51) Int. Cl.
    *A23L 3/16*       (2006.01)
    *A47J 27/04*      (2006.01)
    *A23L 5/20*       (2016.01)
    *A23L 33/20*      (2016.01)
    *A23F 5/20*       (2006.01)
    *A23L 3/40*       (2006.01)
    *A23L 33/00*      (2016.01)
    *A23F 5/00*       (2006.01)
    *A23L 5/10*       (2016.01)
    *A47J 36/24*      (2006.01)

(52) U.S. Cl.
    CPC ............ *A23F 5/20* (2013.01); *A23F 5/204* (2013.01); *A23F 2200/00* (2013.01); *A23L 3/16* (2013.01); *A23L 3/165* (2013.01); *A23L 3/40* (2013.01); *A23L 5/13* (2016.08); *A23L 5/21* (2016.08); *A23L 5/25* (2016.08); *A23L 33/00* (2016.08); *A23L 33/20* (2016.08); *A47J 36/24* (2013.01); *A47J 2027/043* (2013.01)

(58) Field of Classification Search
    CPC .. A23F 5/20; A23F 5/202; A23F 5/206; A23F 5/208; A23F 2200/00; A23L 3/16; A23L 3/165; A23L 5/13; A23L 5/17; A23L 5/21; A23L 33/00; A23L 33/20; A47J 2027/043; A47J 36/24
    USPC ......... 426/45, 418, 419, 443, 455, 465, 520, 426/523
    See application file for complete search history.

(56) References Cited

U.S. PATENT DOCUMENTS

| | | | |
|---|---|---|---|
| 9,867,385 B2* | 1/2018 | Takahashi | A23F 5/02 |
| 2007/0248731 A1* | 10/2007 | Curti | A23F 5/02 426/533 |
| 2009/0041894 A1* | 2/2009 | William Bradbury | A23G 1/002 426/45 |
| 2009/0104309 A1* | 4/2009 | Nakajima | A23F 5/02 426/45 |
| 2010/0143539 A1* | 6/2010 | Minami | A23F 5/02 426/45 |
| 2010/0239711 A1* | 9/2010 | Li | A23F 5/02 426/45 |
| 2010/0247716 A1* | 9/2010 | Castro | A23F 5/14 426/93 |
| 2012/0282371 A1* | 11/2012 | Miller | C12G 3/02 426/14 |
| 2013/0302484 A1* | 11/2013 | Rhee | A01C 1/02 426/238 |
| 2014/0205626 A1* | 7/2014 | Choi | A61K 36/74 424/195.15 |
| 2015/0257405 A1* | 9/2015 | Kelly | A23F 5/02 426/45 |
| 2015/0374007 A1* | 12/2015 | Schnell, II | A23G 1/02 426/45 |
| 2016/0030350 A1* | 2/2016 | Muller | A61K 36/74 424/777 |
| 2016/0037792 A1* | 2/2016 | Kusaura | A23F 5/16 426/460 |
| 2016/0324179 A1* | 11/2016 | Park | A23F 5/02 |

FOREIGN PATENT DOCUMENTS

| | | | |
|---|---|---|---|
| JP | 2002176915 A * | 6/2002 | A23F 5/04 |
| KR | 10-1060203 B1 | 8/2011 | |
| KR | 10-2014-0001301 A | 1/2014 | |
| KR | 10-2015-0126542 A | 11/2015 | |

* cited by examiner

| No. D2016100463 | | | | |
|---|---|---|---|---|
| Test Report | | | | |
| Sample name | | Fermented coffee | Preparation date (expiration date) | October 4, 2016 |
| Requester | Company name | Janggu-*ri Cooperative* | | |
| | Address | 82, Myeongjae-ro 287 beon-gil, Noseong-myeon Nonsan-si, Chungcheongnam-do | | |
| | Name | Seok-Soon Jee | | |
| Preparation No. | | | Date of receipt | October 7, 2016 |
| Purpose of test request | | For submission | Sample receipt No. | D2016100463 |
| The result of the test requested by you is as follows. General manager of test: Cheon-Hoe Kim | | | | |
| Test item | | Result | Person in charge of test | |
| Total polyphenols | | 0.46 mg/g | Eun-Jin Nam | |
| Analysis method-Health Functional Food Code October 20, 2016 Director of Korea Health Supplement Institute | | | | |
| Korea Health Supplement Institute affiliated to Korea Health Supplements Association http://www.khsi.re.kr Tel (031)628-2400 FAX (031)628-0400-1 | | | | |

FIG. 3

METHOD FOR PROCESSING GREEN COFFEE BEANS

CROSS-REFERENCE TO RELATED APPLICATION

This application claims the benefit of Korean Patent Application No. 10-2017-0019219 filed on Feb. 13, 2017, which is hereby incorporated by reference herein in its entirety.

BACKGROUND

1. Technical Field

The present disclosure relates to a method for processing green coffee beans, which includes steaming unroasted green coffee beans so as to increase the polyphenol content of the coffee beans while reducing the caffeine content of the coffee beans to thus increase polyphenol intake and also reducing the unfavorable smell of the coffee beans to thus increase preference for the coffee beans.

2. Description of the Related Art

In general, coffee is an evergreen shrub belonging to the family Rubiaceae. It is cultivated mainly in tropical climate and rainy regions, and coffee grown in high mountain areas at about 2000 meters above the sea level is considered a good commodity.

Commercially grown coffee varieties are classified into three major varieties of *arabica, robusta* and *liberica*. Among these varieties, *arabica* and *robusta* are particularly predominant.

Such coffee is used as instant coffee or roasted coffee beans, and in recent years, roasted coffee beans have been preferred to instant coffee for health and diet.

For drinking of roasted coffee, a method is used which includes roasting and grinding dry green coffee beans, and adding hot water to the obtained green coffee bean powder to obtain a coffee extract. This method is widely used because it makes it possible to enjoy the taste and aroma of green coffee beans.

However, such roasted green coffee beans have a disadvantage in that they require cumbersome processes, including roasting, grinding and extraction processes, which have to be performed directly by the user.

In addition, the roasted coffee beans are likely to undergo oxidation during storage so that the taste and aroma of the coffee beans can be altered, making it impossible to ingest the coffee beans.

In other words, the volatile components in the green coffee beans react with each other to lose their original aroma, and the green coffee beans react with oxygen in the air to change their color to black and alter the taste and aroma, making them unusable.

Meanwhile, it is known that green coffee beans contain large amounts of polyphenolic active ingredients having beneficial effects, including antioxidant and anti-aging effects. Particularly, chlorogenic acid, a kind of polyphenolic compound, has a chemical formula of $C_{16}H_{18}O_9$ and a molecular weight of 354.31 and is a unique coloring substance present in green coffee beans. This chlorogenic acid is known to have the effect of inhibiting the production of peroxide lipids in vivo, the effect of inhibiting cholesterol biosynthesis, antioxidant and anticancer effects, etc. A component that gives the unique taste of coffee is caffeine that is a vegetable alkaloid having a chemical formula of $C_8H_{10}O_2N_4$. It is colorless, odorless and bitter in taste, and has a needle-like crystal structure. Such caffeine have the effects of stimulating the central nervous system to improve mental performance and promote heart function, and acting as a diuretic to increases the amount of urine, and also stimulating the stomach to promotes gastric acid secretion.

However, excessive caffeine intake may cause side effects such as insomnia, caffeine poisoning and the like, and for this reason, public health authorities such as the Ministry of Food and Drug Safety recommend that daily caffeine intake is limited to 400 mg or less.

Meanwhile, it is known that green coffee beans contain large amounts of polyphenolic active ingredients having beneficial effects, including antioxidant and anti-aging effects.

Particularly, chlorogenic acid, a kind of polyphenolic compound, has a chemical formula of $C_{16}H_{18}O_9$ and a molecular weight of 354.31 and is a unique coloring substance present in green coffee beans. This chlorogenic acid is known to have the effect of inhibiting the production of peroxide lipids in vivo, the effect of inhibiting cholesterol biosynthesis, antioxidant and anticancer effects, etc.

In addition, the chlorogenic acid is known to have the effects of delaying the release of glucose into the blood after meal, preventing heart diseases, increasing the concentrations of glycogen and glucose-6-phosphate in the liver, and decreasing blood glucose levels. Furthermore, the chlorogenic acid is known to improve mineral distribution, reduces plasma and liver fats, and inhibit cognitive decline in the elderly.

In addition, since the chlorogenic acid has a low melting point and is mostly melted out at a roasting temperature of about 200 to 250° C., the content of chlorogenic acid in the green coffee bean powder produced is very low.

In general, for intake of an amount of chlorogenic acid (about 800 mg) which is beneficial to the human body, it is required to drink more than five cups of Americano coffee. Since a cup of Americano usually contains about 150 mg of caffeine and about 100 mg of chlorogenic acid, the required amount of chlorogenic acid is ingested when about 8 cups of coffee per day are drunk.

In this case, about 1200 mg of caffeine is ingested, which greatly exceeds the daily caffeine intake recommended by the Ministry of Food and Drug Safety and may adversely affect health.

Therefore, there is a great need to develop a coffee that may have an increased content of chlorogenic acid while having a decreased content of caffeine, and there have been proposed several technologies for producing such a low-caffeine coffee.

For example, Korean Patent No. 10-1060203, entitled "Method for Processing Green Coffee Beans and Green Coffee Beans Produced Thereby", discloses a technology including: steaming unroasted green coffee beans at a temperature of 90 to 106° C. for 5 to 9 hours; drying the steamed coffee beans at a temperature of 50 to 70° C. for 12 to 24 hours; aging the dried coffee beans at room temperature for 1 to 7 hours; steaming the aged coffee beans at a temperature of 90 to 96° C. for 5 to 10 hours; and then repeating drying, aging and steaming.

Patent Document 1 uses a process similar to a process of preparing red *ginseng* using fresh *ginseng*. Through this process, the content of chlorogenic acid can be increased up to 14.589 (mg/g) to increase the intake of the beneficial component.

In addition, the coffee produced by this method showed significantly high sour and sweet testes and more abundant aroma than commercially available general roasted coffee.

Furthermore, the caffeine content of the coffee was 5,409 mg/kg, which is lower than that of roasted coffee, but the caffeine content was still high enough to ingest a large amount of chlorogenic acid.

The method of processing coffee using the steaming process as described above has been proposed as disclosed in Patent Document 1, but it is needed to develop a process capable of lowering the caffeine content of coffee in order to make it possible to ingest a large amount of chlorogenic acid which is a beneficial component.

In addition, steamed and dried coffee as disclosed in Patent Document 1 is preferred by coffee lovers who want to enjoy a coffee having strong sweet and sour tastes, a bitter taste and rich flavor, but non-coffee lovers greatly dislike to eat the coffee.

In addition, the coffee has various aromas, and among such aromas, an unpleasant aroma reduces preference for the coffee. Due to this problem, non-coffee lovers greatly dislike to eat the coffee.

For intake of the beneficial component as described above, there is a need to develop a coffee having an improved taste and aroma so that general people having a low preference for coffee can eat the coffee without disliking, rather than giving a rich aroma and taste to coffee.

SUMMARY

Accordingly, the present disclosure has been conceived to overcome the above problems of the prior art, and an object of the present disclosure is to improve a conventional method of processing coffee using a steaming process and to provide a coffee processing method which can make it possible to drink a large amount of the coffee by increasing the content of polyphenols, such as chlorogenic acid, in coffee while minimizing the content of caffeine, thereby increasing the intake of beneficial components.

Another object of the present disclosure is to reduce the dislike of non-coffee lovers for coffee intake by increasing the possible intake of beneficial components while reducing an unpleasant odor of coffee, thereby making it easy to ingest a large amount of coffee in daily life.

Still another object of the present disclosure is to reduce the bitter taste of coffee by using tourmaline-immersed water as water for steaming green coffee beans, thereby making it easy for non-coffee lovers to ingest a large amount of coffee.

Yet another object of the present disclosure is to minimize the unpleasant aroma and bitter and astringent taste of coffee by using the leaf and flower of Apios, thereby maximizing the preference of non-coffee lovers for coffee.

To achieve the above objects, the present disclosure provides a coffee processing method including: (1) loading unroasted green coffee beans on a mesh-like plate, placing in a container the mesh-like plate having the green coffee beans loaded thereon, introducing water into the bottom of the container so as to be spaced apart from the lower surface of the mesh-like plate, and closing the lid of the container to seal the container; (2) placing the sealed container in a heating cabinet, and then steaming the green coffee beans at low temperature for 10 to 12 days while maintaining the internal temperature of the heating cabinet at 70 to 80° C.; and (3) opening the lid of the container, and then drying the steamed green coffee beans for 4 to 6 days while maintaining the internal temperature of the heating cabinet at 38 to 43° C.

In the above-described configuration, the water in step (1) may be mineral water. In step (1), tourmaline may be placed on the container bottom having the mineral water introduced thereon.

In step (1), a second mesh-like plate may be prepared, and the leaf and flower of Apios may be loaded on the second mesh-like plate, after which the second mesh-like plate may be disposed under the mesh-like plate having the green coffee beans having loaded thereon so as to be spaced apart from the water on the bottom.

In this case, the leaf and flower of Apios may be mixed with each other at a weight ratio of 3:1 and loaded on the second mesh-like plate.

BRIEF DESCRIPTION OF THE DRAWINGS

The above and other objects, features and advantages of the present disclosure will be more clearly understood from the following detailed description taken in conjunction with the accompanying drawings, in which:

FIG. 3 is a test report showing the results of analyzing the polyphenol content of green coffee beans prepared in an example of the present disclosure;

DETAILED DESCRIPTION

Hereinafter, the method for processing green coffee beans according to the present disclosure will be described with reference to the accompanying drawings.

The method for processing green coffee beans according to the present disclosure largely includes a preparation step, a steaming step and a drying step.

1. Preparation Step (Step 1)

Figure 1:
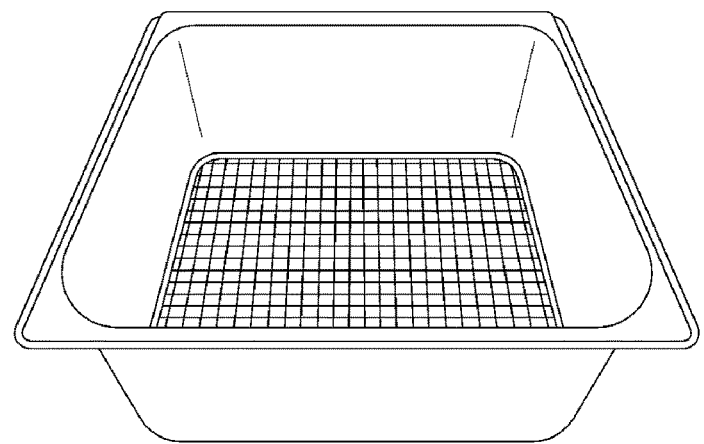
FIG. 1 is a photograph showing a mesh-like plate on which green coffee beans are loaded in step (1) of the method of the present disclosure.

As shown in FIG. 1, a mesh-like plate is prepared, and green coffee beans (not shown) are loaded on the mesh-like plate.

Then, the mesh-like plate having the green coffee beans loaded thereon is placed in a container shown in FIG. 1.

Before or after placement of the mesh-like plate, water is introduced into the container. The water is introduced while adjusting the water level so as to be spaced apart from the lower surface of the mesh-like plate.

Next, the lid (not shown) of the container is closed to seal the inside of the container so as to be isolated from the outside.

In this step, the water is mineral water instead of distilled water.

If general distilled water or fluorine-treated water (tap water) is used, the rate of reduction in the caffeine content will decrease.

Particularly, when tourmaline is disposed on the bottom of the container, an unpleasant odor such as that of fermented coffee can be reduced.

The amount of water used is such that the inside of the container is sealed by the lid and such that the water can sufficiently penetrate the green coffee beans, because heating to 100° C. in a steaming step as described below is not performed. Accordingly, the amount of water used is not particularly limited.

Meanwhile, in the method of the present disclosure, the leaf and flower of Apios (Indian potato) may be loaded on a second mesh-like plate which is disposed under the mesh-like plate having the green coffee beans loaded thereon.

*Apios* (Indian potato) is a climbing plant of the family Fabaceae, which has *rhizobium* and tubers formed in the underground part of the plant. It is native to the temperate and subtropical regions of Eastern North America, which range from Southeastern Canada to Florida and Texas. It is known that this plant has been cultivated in Korea since mid-2000s.

It is known that the tuber of the plant contains starch and protein as main components and has a very high protein content compared to other crops. Particularly, it was recently reported that the tuber also contains saponin, and thus it is known that the tuber is used for food applications.

However, the effect of the leaf or flower of *Apios* has not yet been known, and *Apios* flower tea or enzyme is merely known on the Internet.

The applicant placed *Apios* leaves, obtained by chance, on the bottom of a container and subjected the placed *Apios* leaves to steaming and drying steps as described below. As a result, the applicant has found that the *Apios* leaves significantly reduced the bitter taste of the processed coffee.

Furthermore, it was found that the *Apios* leaves significantly reduced the unpleasant aroma of coffee to enable non-coffee lovers to eat a large amount of the coffee of the present disclosure.

In this case, the ratio between the leaf and flower of *Apios* may vary, but the results of experiments indicated that when the leaf and the flower were mixed at a weight ratio of 3:1, they exhibited excellent effects.

2. Steaming Step (Step 2)

Figure 2:
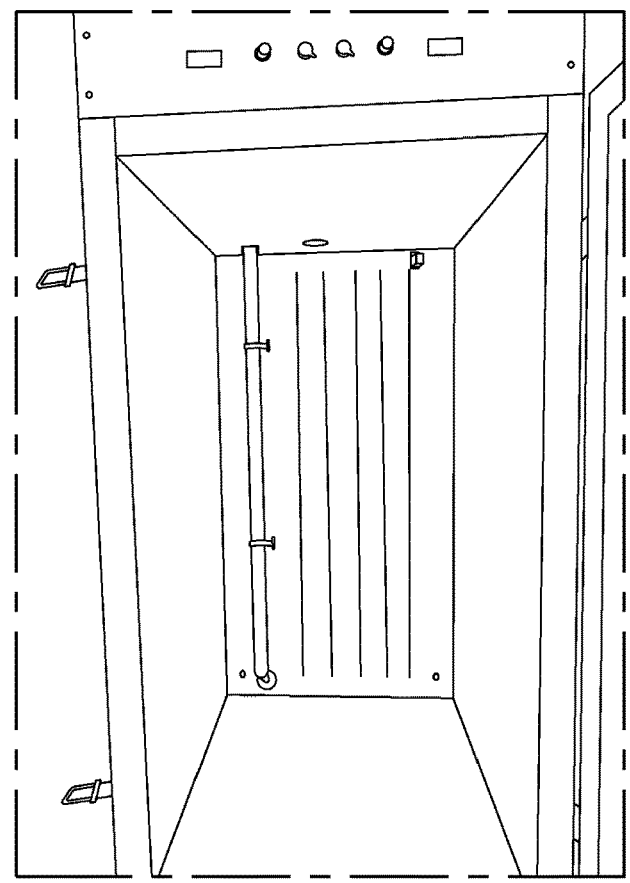
FIG. 2 is a photograph showing an example of a heating cabinet in which steaming and drying of green coffee beans according to the present disclosure are performed.

A heating cabinet as shown in FIG. 2 is prepared, and the sealed container is placed in the heating cabinet. Then, the green coffee beans are steamed at low temperature for 10 to 12 days while the internal temperature of the heating cabinet is maintained at 70 to 80° C.

As shown in FIG. 2, the heating cabinet preferably has an exhaust port which is formed on one side of the interior thereof and through which internal air is discharged, and includes an air supply tube through which air heated by a heater is introduced into the heating cabinet.

In addition, the heating cabinet preferably includes a temperature sensor disposed on one side of the interior thereof, and also includes a control unit which is disposed in the upper portion of the internal space thereof so as to control the operation and heating degree of the heater and which is electrically connected to the temperature sensor so as to control the operation and heating degree of the heater depending on the sensed temperature.

This heating cabinet is configured such that the internal temperature of the heating cabinet having the container placed therein can be maintained at a constant level and heated dry air can be supplied to the heating cabinet.

In this case, a multi-layered shelf (not shown) may be disposed inside the heating cabinet so that a plurality of the containers may be disposed inside the heating cabinet.

The most preferable steaming temperature and time are 75° C. and 11 hours, respectively.

Generally, "steaming" means heating water to 100° C. to change the water into a vapor state and to allow the vapor to give high-temperature water to a target while allowing the vapor to come into contact with the target.

However, in the present disclosure, in a state in which green coffee beans are loaded on the mesh-like plate and in which there water on the bottom of the sealed container, the heating cabinet is set at a temperature of 75° C. Accordingly, an evaporation phenomenon caused by a temperature rise, which is not a vaporization phenomenon caused by water boiling, actually occurs in the heating cabinet.

In addition, water penetrates the texture of green coffee beans while it evaporates at high temperature, and in this procedure, the content of polyphenolic compounds such as chlorogenic acid in the green coffee beans can be increased by water having a temperature lower than 100° C.

Meanwhile, experimental results as described below indicated that, when steaming was performed at the above-described temperature by use of mineral water instead of distilled water, the caffeine content of the green coffee beans was reduced.

This is believed to be attributable to the activity of microorganisms contained in the mineral water, even though an exact mechanism could not be found.

Specifically, the above-described fermentation temperature is a temperature at which microorganisms (thermophilic microorganisms) can be active, and it is believed that when mineral water is used instead of distilled water, microorganisms contained in the mineral water grow, and thus the caffeine content is reduced as a result of the growth of the microorganisms in the fermentation procedure, according to a principle similar to fermentation of luwak coffee.

3. Drying Step (Step 3)

After the lid of the container is opened, the steamed green coffee beans are dried for 4 to 6 days while the internal temperature of the heating cabinet is maintained at 38 to 43° C.

When the drying step is performed, water is removed from the steamed green coffee beans.

If drying of the steamed green coffee beans is performed at a temperature higher than the upper limit of the above-described temperature range, beneficial components can be destroyed, and if the drying temperature is lower than the lower limit of the temperature range, the drying time can be increased.

When there is water on the bottom of the container after the steaming step, the drying is performed after removal of the water.

EXAMPLES

Example 1: Processing 1 of Green Coffee Beans

Unroasted Colombian green coffee beans were purchased and prepared. Then, 200 ml of distilled water was introduced into a container shown in FIG. 1, after which 500 g of the green coffee beans were loaded on a mesh-like plate shown in FIG. 1. Next, the lid of the container was closed, and then a tape was wrapped around the lid to seal the inside of the container.

Thereafter, the container was placed in a heating cabinet shown in FIG. 2, and then a controller was set to set the internal temperature of the heating cabinet at 75° C., and the green coffee beans were steamed for 11 days.

Next, the lid was separated to open the inside of the container, and then the controller was set to set the internal temperature of the heating cabinet at 40° C., followed by drying of the steamed green coffee beans for 5 days.

Example 2: Processing 2 of Green Coffee Beans

This Example was performed in the same manner as Example 1, except that mineral water was introduced instead of distilled water, followed by steaming and drying.

Example 3: Processing 3 of Green Coffee Beans

This Example was performed in the same manner as Example 2, except that tourmaline was placed on the bottom of the container after introduction of mineral water so that the tourmaline would be immersed in the mineral water, followed by steaming and drying.

Example 4: Processing 4 of Green Coffee Beans

This Example was performed in the same manner as Example 1, except that a second mesh-like plate was prepared, the leaf and flower of *Apios* were mixed at a weight ratio of 1:1 and loaded on the second mesh-like plate which was then disposed to be spaced apart from the water on the container bottom, and the mesh-like plate having the green coffee beans loaded thereon was disposed over the second mesh-like plate, followed by steaming and drying.

Example 5: Processing 5 of Green Coffee Beans

This Example was performed in the same manner as Example 2, except that a second mesh-like plate was prepared, the leaf and flower of *Apios* were mixed at a weight ratio of 1:1 and loaded on the second mesh-like plate which was then disposed to be spaced apart from the water on the container bottom, and the mesh-like plate having the green coffee beans loaded thereon was disposed over the second mesh-like plate, followed by steaming and drying.

Example 6: Processing 6 of Green Coffee Beans

This Example was performed in the same manner as Example 3, except that a second mesh-like plate was prepared, the leaf and flower of *Apios* were mixed at a weight ratio of 1:1 and loaded on the second mesh-like plate which was then disposed to be spaced apart from the water on the container bottom, and the mesh-like plate having the green coffee beans loaded thereon was disposed over the second mesh-like plate, followed by steaming and drying.

Example 7: Processing 7 of Green Coffee Beans

This Example was performed in the same manner as Example 6, except that the leaf and flower of *Apios* were mixed at a weight ratio of 2:1, followed by steaming and drying.

Example 8: Processing 8 of Green Coffee Beans

This Example was performed in the same manner as Example 6, except that the leaf and flower of *Apios* were mixed at a weight ratio of 3:1, followed by steaming and drying.

Example 9: Processing 9 of Green Coffee Beans

This Example was performed in the same manner as Example 6, except that the leaf and flower of *Apios* were mixed at a weight ratio of 4:1, followed by steaming and drying.

Comparative Example 1

The same green coffee beans as described in Example 1 were purchased and placed in a steam cooker which was then closed, after which the green coffee beans were steamed at 100° C. for 7 hours.

After completion of the steaming, the green coffee beans were taken out and placed in a heating cabinet shown in FIG. 2, after which the coffee beans were dried at 60° C. for 16 hours. The dried coffee beans were taken out and aged at room temperature for 5 days.

Comparative Example 2

The steaming, drying and aging described in Comparative Example were repeated once.

Comparative Example 3

This Example was performed in the same manner as Example 1, except that the steaming temperature was set at 85° C., followed by steaming and drying.

Comparative Example 4

This Example was performed in the same manner as Example 1, except that the steaming temperature was set at 65° C., followed by steaming and drying.

The processed green coffee beans prepared in each of the Examples and the Comparative Examples were ground to obtain coffer powder. Then, 10 g of the coffee powder was extracted with 120 ml of hot water to prepare coffee beverages, and the coffee beverages were subjected to sensory tests.

Test Example 1: Sensory Test for Taste

A sensory test for the coffee beverages prepared in the Examples and the Comparative Examples was performed.

In the sensory test, the sour taste, bitter taste, sweet taste, astringent taste and fishy taste of each coffee beverage were evaluated using a 9-point scale. As participants in the test, non-coffee lovers who do not prefer coffee beverages were selected through a preliminary questionnaire.

In addition, as the participants in the test, a total of 50 adult men and women in their 20s to 60s (each age group consisting of 10 persons) were selected in consideration of age and gender.

Table 1 below shows the results of the sensory test for the taste.

TABLE 1

|  | Sour taste | Bitter taste | Sweet taste | Astringent taste | Fishy taste |
|---|---|---|---|---|---|
| Example 1 | 4.0 | 4.2 | 5.2 | 3.9 | 2.5 |
| Example 2 | 3.6 | 3.7 | 5.1 | 3.5 | 2.1 |
| Example 3 | 3.7 | 3.2 | 5.6 | 3.1 | 1.9 |
| Example 4 | 3.5 | 3.5 | 5.5 | 3.7 | 2.1 |
| Example 5 | 3.4 | 3.3 | 5.6 | 3.3 | 1.9 |

TABLE 1-continued

|  | Sour taste | Bitter taste | Sweet taste | Astringent taste | Fishy taste |
|---|---|---|---|---|---|
| Example 6 | 3.3 | 3.0 | 5.7 | 2.7 | 2.3 |
| Example 7 | 3.4 | 3.1 | 5.7 | 2.6 | 2.2 |
| Example 8 | 2.5 | 1.5 | 5.9 | 1.6 | 1.5 |
| Example 9 | 3.5 | 3.2 | 5.8 | 2.7 | 2.4 |
| Comparative Example 1 | 7.3 | 5.8 | 6.3 | 6.3 | 3.2 |
| Comparative Example 2 | 8.2 | 6.3 | 7.1 | 6.7 | 2.4 |
| Comparative Example 3 | 6.8 | 6.7 | 5.8 | 5.6 | 4.2 |
| Comparative Example 4 | 6.3 | 7.8 | 4.3 | 7.3 | 5.9 |

*Sensory test score (9: very high, 0: very low).

As shown in Test Example 1, the Comparative Examples generally showed higher scores than the Examples in respect of all the sour taste, the bitter taste, the sweet taste, the astringent taste and the fishy taste.

This suggests that the coffee beverages of the Comparative Examples give a rich flavor to coffee lovers, but the sour, bitter and astringent tastes and the like are tastes that are not preferred by non-coffee lovers, indicating that the coffee beverages of the Examples are more preferred by non-coffee lovers.

Particularly, the sensory test scores of Comparative Examples 3 and 4, which were performed using the same process as that of Example 1 and did differ from the Example 1 only with respect to the steaming temperature, did greatly differ from those of Example 1, indicating that the steaming temperature did play an important role in the tastes.

In addition, it can be seen that the scores of the bitter and astringent tastes in Example 8 were very significantly lower than those of other Examples.

Test Example 2: Sensory Test for Aroma

A sensory test for the aroma of the coffee beverages prepared in the Examples and the Comparative Examples was performed.

In the sensory test, the flower aroma, sweet aroma, unpleasant aroma and burnt smell of each coffee beverage were evaluated using a 9-point scale. As participants in the test, non-coffee lovers who do not prefer coffee beverages were selected through a preliminary questionnaire.

In addition, as the participants in the test, the same participants as used in Example 1 were selected.

Table 2 below shows the results of the sensory test for the aroma.

TABLE 2

|  | Flavor aroma | Sweet aroma | Unpleasant aroma | Burnt aroma |
|---|---|---|---|---|
| Example 1 | 6.3 | 6.1 | 3.9 | 3.2 |
| Example 2 | 6.2 | 6.2 | 3.8 | 3.1 |
| Example 3 | 6.4 | 6.8 | 3.6 | 2.6 |
| Example 4 | 6.7 | 5.8 | 3.3 | 3.1 |
| Example 5 | 6.5 | 6.0 | 3.4 | 3.0 |
| Example 6 | 7.3 | 6.2 | 3.1 | 2.9 |
| Example 7 | 7.5 | 6.3 | 3.2 | 2.6 |
| Example 8 | 7.8 | 7.5 | 2.3 | 2.1 |
| Example 9 | 7.5 | 6.7 | 3.4 | 2.5 |
| Comparative Example 1 | 7.7 | 5.3 | 7.5 | 4.2 |
| Comparative Example 2 | 8.1 | 5.8 | 8.2 | 4.3 |
| Comparative Example 3 | 6.8 | 6.1 | 7.4 | 4.8 |
| Comparative Example 4 | 6.7 | 6.0 | 7.2 | 5.1 |

*Sensory test score (9: very high, 0: very low).

As shown in Test Example 2, although there was a slight difference in the sweet aroma between the Examples and the Comparative Examples, Comparative Examples 1 to 4 showed high scores for the unpleasant aroma, whereas the Examples generally showed significantly low scores for the unpleasant aroma.

Particularly, the sensory test scores of Comparative Examples 3 and 4, which were performed using the same process as that of Example 1 and did differ from the Example 1 only with respect to the steaming temperature, did greatly differ from those of Example 1, indicating that the steaming temperature did play an important role in the unpleasant aroma.

In addition, it can be seen that the scores of the burnt smell in the Examples were very significantly lower than those of the Comparative Examples.

Test Example 3: Sensory Test for Taste, Aroma and Preference

Subjective feeling for the taste, aroma and preference for the coffee beverages prepared in the Examples and the Comparative Examples was evaluated using a 9-point scale. As participants in the test, non-coffee lovers who do not prefer coffee beverages were selected through a preliminary questionnaire.

In addition, as the participants in the test, the same participants as used in Example 2 were selected.

Table 3 below shows the results of the sensory test for the taste, aroma and preference for each coffee beverage.

TABLE 3

|  | Taste | Aroma | Preference |
|---|---|---|---|
| Example 1 | 6.6 | 5.6 | 6.1 |
| Example 2 | 6.7 | 5.7 | 6.4 |
| Example 3 | 7.3 | 6.5 | 6.9 |
| Example 4 | 6.8 | 6.1 | 6.1 |
| Example 5 | 7.0 | 6.2 | 6.4 |
| Example 6 | 7.2 | 6.5 | 6.9 |
| Example 7 | 7.1 | 6.7 | 7.0 |
| Example 8 | 8.2 | 7.5 | 7.7 |
| Example 9 | 7.0 | 6.6 | 6.8 |
| Comparative Example 1 | 4.3 | 3.5 | 3.8 |
| Comparative Example 2 | 4.5 | 3.1 | 3.7 |
| Comparative Example 3 | 5.2 | 4.4 | 3.3 |
| Comparative Example 4 | 5.1 | 4.3 | 4.6 |

*Sensory test score (9: very good; 0: very poor).

As shown in Test Example 3, evaluation of the overall taste, aroma and preference for Examples 1 to 4 was negative, whereas overall evaluation of the Examples was positive.

In particular, it can be seen that Example 8 showed significantly higher scores than other Examples in respect of all the taste, the aroma and the preference.

Test Example 4: Polyphenol Content

The inventor of the present application provided the green coffee beans processed in Example 3 to the Korea Health Supplement Institute, and requested the analysis of the content of total polyphenols in the coffee beans, and received a test report on Oct. 20, 2016. The result of the analysis is shown in Table 4 below, and the test report is shown in FIG. 3.

TABLE 4

| Test item | Result |
| --- | --- |
| Total polyphenols (mg/g) | 0.46 mg/g |

Test Example 5: Chlorogenic Acid Content

Figure 4:
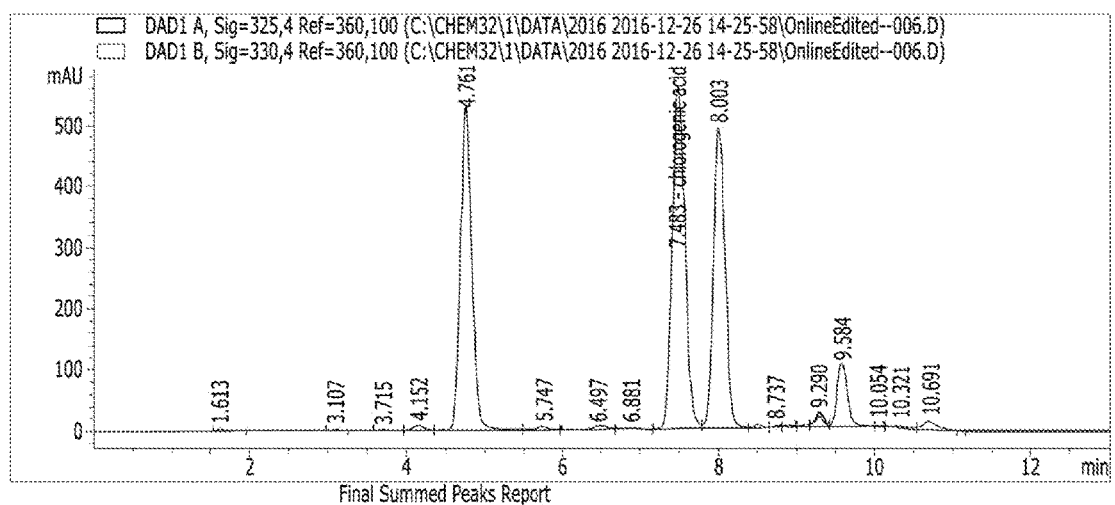
FIG. 4 is an excerpt from a test report, which shows the results of analyzing the chlorogenic acid content of green coffee beans prepared in an example of the present disclosure.

The green coffee beans processed in Example 3 were subjected to quantitative analysis in the central laboratory of Chungnam National University. The result of the test was received on Dec. 26, 2016. The result is shown in Table 5 below, and the HPLC graph is shown in FIG. 4.

TABLE 5

| Test item | Result | Analysis method |
| --- | --- | --- |
| Chlorogenic acid (mg/l) | 194.91698 (mg/l) | HPLC |

Test Example 6: Caffeine Content

Figure 5:
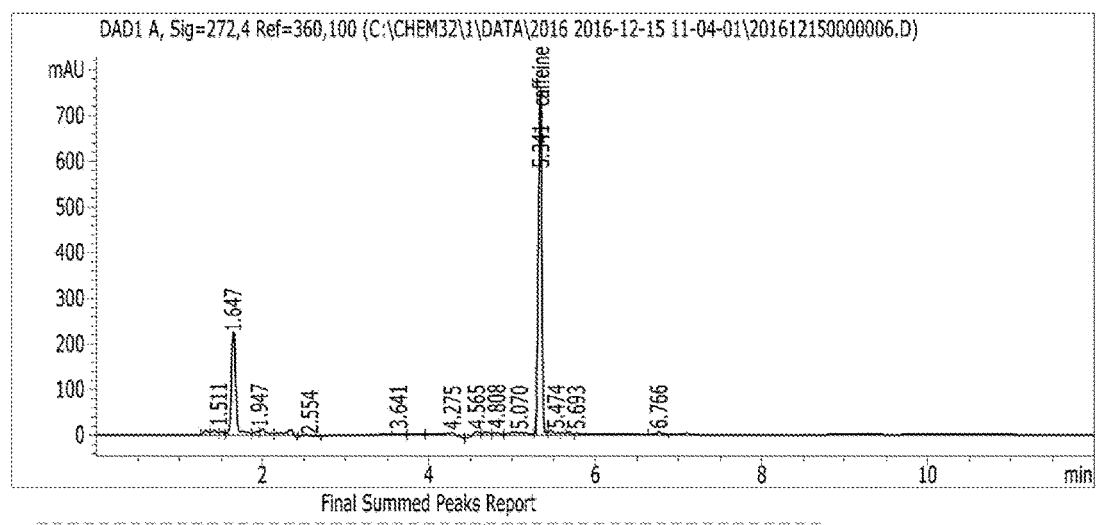
FIG. 5 is an excerpt from a test report, which shows the results of analyzing the caffeine content of green coffee beans prepared in an example of the present disclosure.

The green coffee beans processed in Example 3 were subjected to quantitative analysis in the central laboratory of Chungnam National University. The result of the test was received on Dec. 26, 2016. The result is shown in Table 5 below, and the HPLC graph is shown in FIG. 5.

TABLE 6

| Test item | Result | Analysis method |
| --- | --- | --- |
| Caffeine (mg/l) | 158.3863 (mg/l) | HPLC |

The polyphenol content, chlorogenic acid content and caffeine content described in Test Examples 4 to 6 are values measured for Example 3. In addition, Examples 6 to 9 were performed in the same as Example 3, except that the leaf and flower of *Apios* were loaded on the second mesh-like plate. Accordingly, it is believed that the polyphenol content, chlorogenic acid content and caffeine content of Examples 6 to 9 are the same as or similar to those of Example 3.

From the results shown in Test Examples 4 to 6, it can be seen that the content of polyphenols including chlorogenic acid was very high, and nevertheless the content of caffeine was very low.

Accordingly, it is believed that when a coffee beverage prepared using the green coffee beans processed by the processing method of the present disclosure is drunk, large amounts of beneficial components can be ingested while caffeine intake can be reduced.

In addition, as described above, the unpleasant odor and bitter and astringent tastes of the green coffee beans of the present disclosure are reduced compared to those of conventional green coffee beans processed by steaming, and thus the dislike of non-coffee lovers for intake of a large amount of coffee can be minimized.

As described above, the present disclosure improves a conventional method of processing coffee using a steaming process, and provides a coffee processing method which may increase the content of polyphenols such as chlorogenic acid in coffee while minimizing the content of caffeine to make it possible to drink a large amount of the coffee, thereby increasing the intake of beneficial components.

Furthermore, the present disclosure makes it possible to increase the possible intake of beneficial components while reducing an unpleasant odor of coffee to reduce the dislike of non-coffee lovers for coffee intake so as to make it easy to ingest a large amount of coffee in daily life.

Moreover, according to the present disclosure, the bitter taste of coffee can be reduced by using tourmaline-immersed water as water for steaming green coffee beans to thereby make it easy to ingest a large amount of coffee by non-coffee lovers.

In addition, according to the present disclosure, the unpleasant aroma and bitter and astringent taste of coffee can be minimized by use of the leaf and flower of *Apios* to thereby maximize the preference of non-coffee lovers for coffee.

Although the specific embodiments of the present disclosure have been disclosed for illustrative purposes, those skilled in the art will appreciate that various modifications, additions and substitutions are possible without departing from the scope and spirit of the present disclosure as disclosed in the accompanying claims.

What is claimed is:

1. A method for processing green coffee beans, the method comprising:
   (1) loading unroasted green coffee beans on a mesh plate, placing in a container the mesh plate having the green coffee beans loaded thereon, introducing mineral water into a bottom of the container so as to be spaced apart from a lower surface of the mesh plate, placing tourmaline on the bottom of the container, and then closing a lid of the container to seal the container;
   (2) placing the sealed container in a heating cabinet, and then steaming the green coffee beans for 11 days while maintaining an internal temperature of the heating cabinet at 75° C.; and
   (3) opening the lid of the container, and then drying the steamed green coffee beans for 5 days while maintaining the internal temperature of the heating cabinet at 40° C.;
   wherein step (1) further comprises preparing a second mesh plate, mixing an *apios* leaf and an *apios* flower with each other at a weight ratio of 3:1, respectively to obtain a mixture, loading the mixture on the second mesh plate, and then disposing the second mesh plate under the mesh plate having the green coffee beans loaded thereon so as to be spaced apart from the mineral water on the bottom of the container.

* * * * *